United States Patent [19]

Meyer

[11] 4,100,388

[45] Jul. 11, 1978

[54] ELECTROEROSION METHOD AND APPARATUS FOR MACHINING UNDERCUT CHANNELS IN A WORKPIECE

[76] Inventor: Gilbert Meyer, 184 Berkely Ct., Cornwells Heights, Pa. 19020

[21] Appl. No.: 757,635

[22] Filed: Jan. 7, 1977

[51] Int. Cl.² .............................................. B23P 1/08
[52] U.S. Cl. ............................... 219/69 M; 204/129.1; 219/69 E; 219/69 G
[58] Field of Search ................ 219/69 M, 69 E, 69 V, 219/69 R, 69 G; 204/129.1

[56] References Cited

U.S. PATENT DOCUMENTS

| | | | |
|---|---|---|---|
| 2,773,968 | 12/1956 | Mantellotti et al. | 219/69 E |
| 2,778,925 | 1/1957 | Gross et al. | 219/69 E |
| 2,902,584 | 9/1959 | Ullmann | 219/69 E |

Primary Examiner—Bruce A. Reynolds
Attorney, Agent, or Firm—Flynn & Frishauf

[57] ABSTRACT

Long undercut channels, such as a dovetail channel, are cut by electroerosion into a workpiece by a succession of electrodes each operating to provide electroerosion along the whole length of the groove rather than by an electrode passing lengthwise down the groove. The electrodes are successively advanced obliquely into the workpiece, the path of one electrode intersecting that of the other electrode or electrodes, the non-working electrodes being retracted while one of the electrodes is advanced for operation. An arrangement for simultaneously cutting two dovetail channels oppositely located on the inside of a tubular workpiece is illustrated.

21 Claims, 9 Drawing Figures

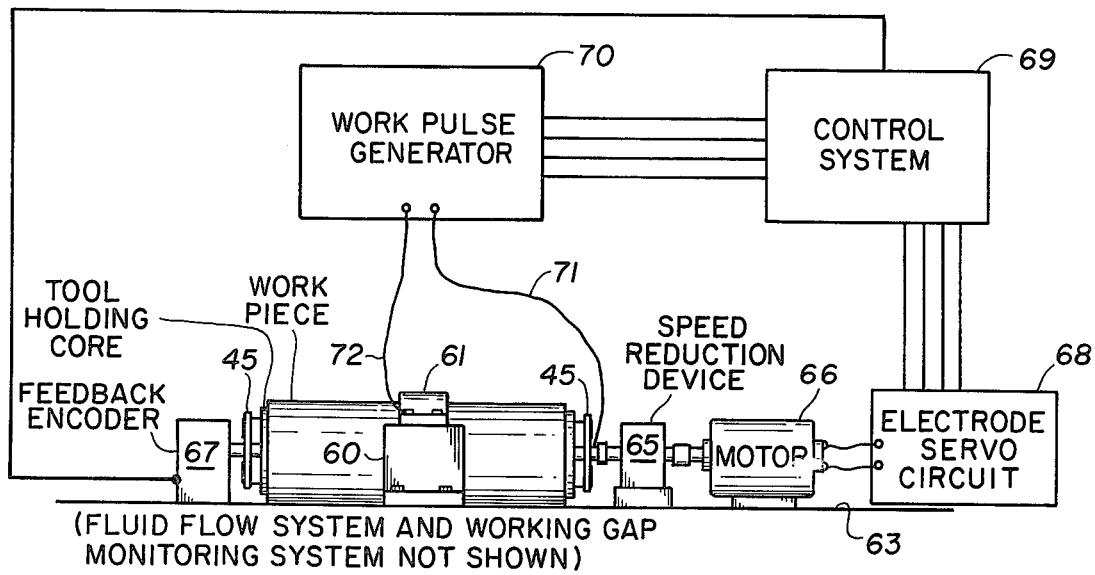
FIG. 3
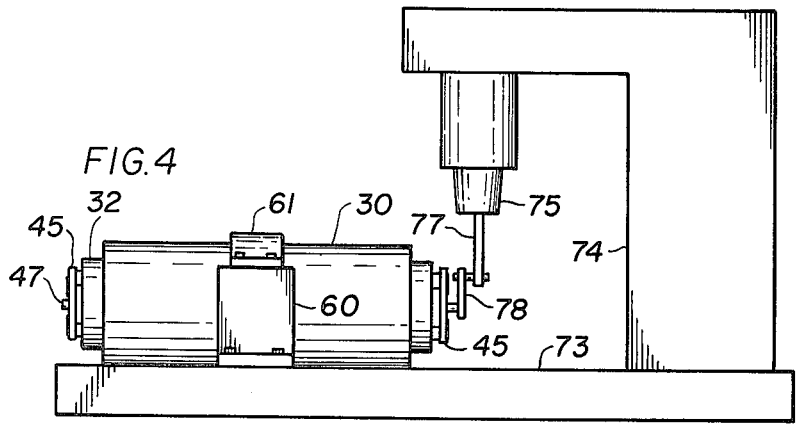
FIG. 4
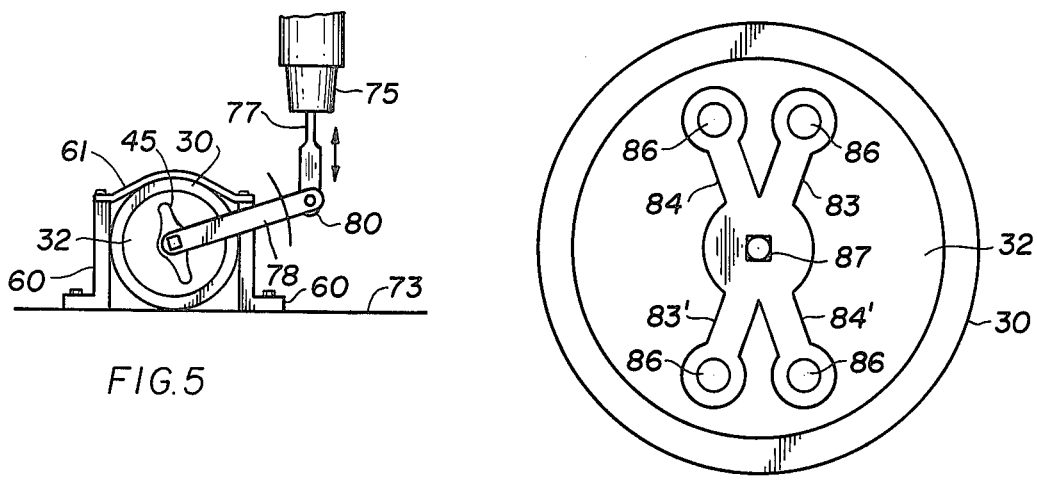
FIG. 5
FIG. 6

ELECTROEROSION METHOD AND APPARATUS FOR MACHINING UNDERCUT CHANNELS IN A WORKPIECE

This invention relates to the making of long channels and grooves by electroerosion, particularly by electric discharge machining (EDM) and electrochemical machining (ECM), and particularly channels with undercut profiles such as dovetail channels for keying metal parts together, with rapidity and accuracy.

The machining of an undercut groove or channel, such as a dovetail channel or keyway channel in a metal plate or tube, has heretofore been accomplished by an electroerosion process by providing an electrode having substantially the profile of the channel to be produced and moving the electrode towards the workpiece in the direction of the length of the channel, so that after the electrode reaches a position where it is at the proper gap distance for the workpiece for the electroerosion process to begin, the electrode then moves lengthwise of the channel, penetrating into the workpiece and cutting the channel by electroerosion.

The procedure just described has the disadvantage that the surfaces eroded at any one time are small, which is to say that they represent a small portion of the surface of the groove or channel to be cut, so that a long time is required to complete the operation, and the further disadvantage that as the tool electrode proceeds down the length of the channel, it is subjected to erosion, so that the profile and dimensions of the channel cut will tend to change along the length of the channel. In order to prevent change of profile in excess of required tolerances, it is frequently necessary to change the tool electrodes one or more times before the completion of a single channel, if the channel is of any great length.

It is an object of the present invention to provide a method and apparatus for machining undercut channels in metal workpieces by electroerosion with a relatively large active area of electroerosion in a relatively short time in a manner not subject to variation of profile along the length of the channel.

It is also an object of the invention to provide a method and apparatus for cutting undercut channels in a metal workpiece by electroerosion by which more than one such channel can be cut at the same time and by which such channels can be cut on the interior surfaces of tubular workpieces.

SUMMARY OF THE INVENTION

Briefly, for each channel to be cut on a workpiece as part of one operation, a plurality of tool electrodes are provided in a tool holding fixture, movably in the fixture. Each electrode has a workpiece-engaging surface that is as long as the channel to be cut and the several electrodes are mounted and movable in the fixture at different angles of advance into the workpiece and are sequentially operated under the control of the usual electro advance servo system for maintaining the proper operating gap conditions for electroerosion. If two or more channels are to be cut at the same time, corresponding electrodes of each set can be actuated simultaneously.

The electrode holding fixture, particularly in the case of cutting undercut channels on the inside of tubular workpieces, may also contain channels for bringing the necessary liquid medium to the electroerosion gap and for draining the liquid medium after it has served its function in the gap.

Although in principle the invention is applicable both to ECM, where the liquid is an electrolyte and the erosion is electrochemical, and to EDM, where the liquid is a dielectric medium to flush the gap and remove particles eroded off the workpiece and tool and the erosion is by electric discharges across the gap, the invention will be illustrated here with reference to EDM electroerosion.

The invention is further described, in principle, and by way of illustrative example, with reference to the accompanying drawings, in which:

FIG. 3 is a diagrammatic illustration of an electrode fixture of the kind shown in FIG. 2 in an EDM system;

FIG. 4 is a diagrammatic side view of a fixture of the kind shown in FIG. 2 mounted for use in a general-purpose EDM apparatus;

FIG. 5 is a detail end view of the fixture of FIG. 2 as utilized in accordance with FIG. 4;

FIG. 6 is a diagrammatic end view of an alternative mechanism for displacing the electrodes in a fixture of the kind shown in FIG. 2;

DETAILED DESCRIPTION OF PREFERRED EMBODIMENTS

Figure 1:
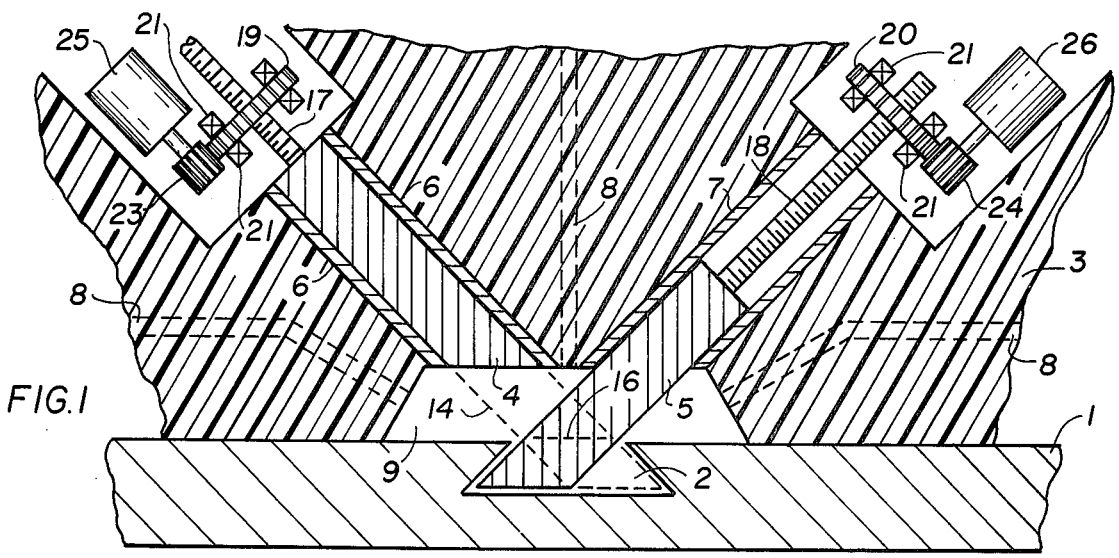
FIG. 1 is a cross-sectional diagram illustrating the principle of the invention.

FIG. 1 shows, in cross-section, part of a steel plate 1 which is a workpiece in which it is desired to cut a channel 2, of dovetail profile, running in a direction perpendicular to the plane of the drawing and of such length that doing so with an electrode moving along the length of the groove would be subject to serious disadvantages already discussed above. There is also shown a portion of a fixture 3 in which electrodes 4 and 5 are movably mounted. Since the fixture 3 rests against the workpiece 1, at least the portion of the fixture near the workpiece 1 must be made of insulating material, and for purposes of illustration, it is assumed that the fixture 3 is made of insulating material except for the guideways 6 and 7 and such other metal inserts may be necessary for mounting, controlling and providing the movement of the electrodes. The fixture 3 is also provided with a channel 8 leading into a cavity 9 opposite the portion of the workpiece 1 in which the channel 2 is to be cut.

In order to cut the channel 2, the electrode 4 is first advanced to the position shown by the dashed lines 14. During this advance, the electrode 5 is in a retracted position such as that shown for the electrode 4 in FIG. 1, rather than in the provision shown in the figure. The advance of the electrode 4 to the position of the dotted line 16 may be made rapidly and, if desired, prior to the application of the EDM potential. Thereafter, the advance of the electrode 6 into the workpiece 1 is under control of the usual servo system for maintaining the proper working conditions in the gap between the tool electrode and the workpiece, while the usual dielectric flushing liquid is supplied through the channels 8 (and may flow through other channels, not shown) or through the ends of the cavity 9 that may be open at the ends of the fixture.

As soon as the electrode 4 has reached the position shown in the dashed lines, the erosion process is stopped, this being done automatically in the usual way by automatic detection of when the electrode has reached the proper end position, and the electrode is then retracted to its idle position shown in the drawing.

As soon as the electrode 6 has been withdrawn out of the path of advance of the electrode 5, the electrode 5 is rapidly advanced to a working position indicated by the dotted lines 16, at which point the electroerosion process is resumed as the electrode advances under process servo control to the position shown in FIG. 1. At this point, the channel is completely cut and the erosion process may again be automatically terminated and the electrode retracted to its idle position, so that a new cycle of operation may begin on another workpiece, or at another position on the same workpiece.

In FIG. 1, the means for advancing and retracting the electrodes 4 and 5 are symbolically shown by threaded control rods 17 and 18 actuated by threaded disks 19 20 mounted in bearings (such as ball races 21 mounted by means not shown in the fixture 3) and driven by gear teeth engaging pinions 23 and 24, which are in turn driven by servo motors 25 and 26 likewise mounted in the fixture 3. Since the electrodes 4 and 5 are relatively long in the dimension perpendicular to the plane of the drawing, which is to say they are necessarily as long as the channel 2 which is to be cut, it is of course important that the arrangement for advancing and retracting the electrodes should provide for advance of the electrodes evenly along the length of the channel 2 to be cut, and this may require applying the advancing drive simultaneously at both ends of the electrode by appropriate mechanical linkage or other measures to assure an even advance of the electrode into the workpiece.

Figure 2:
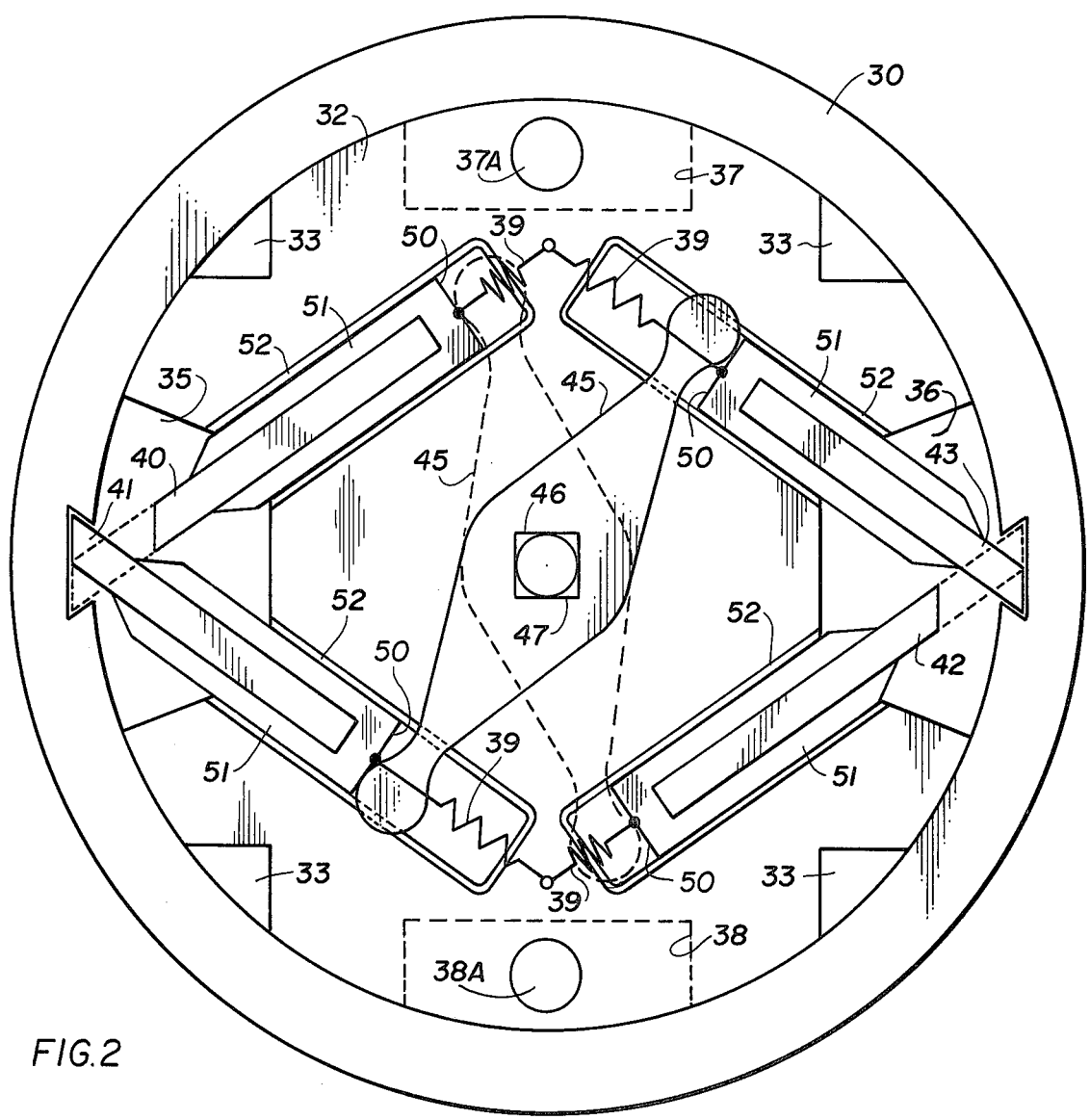
FIG. 2 is an end view of a fixture for electroerosion cutting of a pair of dovetail keyways at diammetrically opposite locations on the inner surface of a tubular workpiece.

FIG. 2 illustrates a fixture applying the principle illustrated with reference to FIG. 1 to the simultaneous provision by EDM of a pair of diametrically opposed dovetail keyways on the interior of a tubular workpiece 30. In this case, the fixture 3 of FIG. 1 becomes the tool holding core 32, which is secured firmly with respect to the workpiece 30, by clamping means (not shown) which may be expandable members inserted in the longitudinal peripheral cavities 33 provided in the core 32. The channels for supplying the dielectric flushing liquid to the work cavities 35 and 36 are not shown in FIG. 2 to simplify the drawing. There are shown in the figure a liquid supply cavity 37 fed through an aperture 37a along the top of the core 32 and a liquid drain cavity 38 with an end orifice 38a. The cavities 37 and 38 are connected by ducts (not shown) with the work cavities 35 and 36.

Since the electrodes 40, 41, 42 and 43 are in this case driven in pairs composed of one electrode in each work cavity, they may be driven at each end by a cross arm, such as the cross arm 45 keyed as shown at 46 on the shaft 47 which is centered on the axis of the core 32 and of the workpiece 30. A separate cross arm is not necessary for each pair of electrodes and in the fixture illustrated in FIG. 2, a single cross arm 45, and preferably one such at each end of the fixture, can sequentially drive first one pair of electrodes and then the other. In this case, the cross arm 45 does not have its ends firmly linked to any of the electrodes and the electrodes are retracted by springs 39. The retracted electrodes will remain in retracted position when the cross arm 45 moves over to drive the other two electrodes. The cross arm 45 drives the electrodes by bearing against the back edge 50 of a portion of the electrode extending beyond the end of the core 32 in the direction perpendicular to the drawing.

In FIG. 2, the cross arm 45 is shown in full lines in its position corresponding to the greatest advance of the electrode 41 in work cavity 35 and the electrode 43 in work cavity 36. The cross arm 45 is shown in dashed lines in its position in which it begins to propel the electrodes 40 and 42 from their idle positions shown in the drawing in full lines to their work end positions shown in dashed lines.

In FIG. 2, the electrodes 40, 41, 42 and 43 are mounted in movable holders 51 against the back of which the ends of the cross arm 45 actually bear in driving position. The holders 51 respectively slide in guideways 52 in the form of slot liners provided in the core 32. The manner of operation is essentially as described in connection with FIG. 1, but the electrode advance movement is provided by a much geared-down motor applying force applied to the shaft 47. The shaft 47, of course, rotates only through a part of a revolution in each direction in its operation. In the portion of the cycle in which one or the other of the electrode pairs is in EDM working position, the rotation of the shaft 47 is controlled by the tool advance servo circuit of an EDM system.

FIG. 3 diagrammatically shows the use of a fixture in the form of the tool core 32 of FIG. 2 in an electroerosion system. In this case, the system is shown without regard to any features needed for doing any other kind of electroerosion work with it, just as if the EDM system were always going to be used with a fixture of this type.

In FIG. 3, the workpiece is mounted by clamps 60 and 61 on a work table 63, with the tool-holding core mounted inside of the workpiece. The drive shaft of the core fixture is connected at one end to a speed reduction device 65 driven by a motor 66, and at the other end to a position indication encoder 67. The motor 66 is controlled by an electrode servo circuit 68 which controls the motor 66 in response to program control signals from a control system 69, as well as working gap condition signals received from a working gap monitoring system, not shown in the drawing to simplify the illustration. The control system 69 also controls a work pulse generator 70, that control also being exerted with reference to the data provided by the working gap monitoring system previously mentioned and not shown. The work pulse generator 70 applies the work pulses to the gap between the working electrodes and the workpiece through connections symbolically shown by the wires 71 and 72 going respectively to the electrodes and to the workpiece, the latter usually being grounded to the work table 63. The operation of an EDM system is well known and does not need to be further described here.

It should be mentioned here, however, that electric discharge machining equipment exists today in a great variety of forms, particularly with respect to the control systems that deal with the problem of, on the one hand preventing short-circuits that might result from the electrode being advanced too close to the workpiece, so that the presence of particles moved around in the gap by the flow of the flushing liquid produces a short-circuit and, on the other hand, preventing the operation from proceeding at low efficiency with a low rate of material removal because the electrode is too far removed from the workpiece for efficient machining. Some systems for controlling the electrode advance in this regard provide a control with reference to the discharge voltage across the gap, which of course varies with the gap width. Others provide a control with reference to the average current in the gap. Furthermore, the controls may operate simply to provide increments of electrode advance or retraction designed to maintain the reference parameter of the process within a specified range of value. The controls may in addition be used, however, to modify the pulse frequency or duty cycle, or the like, to modify the rate of flow of the flushing liquid or to set in motion or modify the stroke of a periodic backingoff of the electrode designed to clear accumulations of eroded material in the gap. In systems of more recent design, the control of the electrode advance is likely to be accomplished with reference to two or more parameters of the EDM process, as illustrated, for example, by U.S. Pat. No. 3,859,186 and U.S. patent application Ser. No. 527,889, filed Nov. 27, 1974, now U.S. Pat. No. 3,975,607, both owned by the assignee of the present application. Similarly, in the ECM branch of electroerosion processes control of the electrode advance is likewise generally accomplished by reference to one or more parameters of the electroerosion process. Thus, it may generally be said that in an electroerosion process carried out with present day equipment, the electrode advance servo drive operates, or is controlled, with reference to at least one parameter of the electroerosion process.

FIG. 4 shows the workpiece 30 and the core fixture 32 mounted on the table 73 of a general purpose EDM apparatus 74 having a vertically operating tool holding head 75. It may be assumed that the apparatus 74 is provided with a control system, electro servo circuit and motor, work pulse generator, fluid flow system, working gap monitoring system, position information feedback encoder, and so on. The vertical motion of the spindle 77 is transmitted to a crank 78 to operate the shaft 47 of the tool holding core 32. This linkage is also shown in FIG. 5, which is an end view of the workpiece 30 and the core 32, as seen from the right hand end of these components shown in FIG. 4. The spindle 77 has a flattened end 80 for linkage with the crank 78. FIGS. 4 and 5 thus indicate that the fixture 32 is easily useable in a general purpose EDM apparatus for the practice of the present invention.

FIG. 6 illustrates an alternative drive system for a core fixture 82 in which the electrodes are mounted in the same manner as in the core 32 of FIG. 2, but differently actuated as now to be described. In this case, cross arms 83 and 84 are provided at each end of the fixture, one for each pair of electrodes, so that it is not necessary to use springs for retracting the electrodes if a suitable rod and slot linkage is provided between the rods 86 passing through the core fixture and the adjacent electrodes. Each of the cross arms 83 and 84 is required to move through a smaller angle of rotation of its shaft than that through which the cross arm 45 of FIG. 2 rotates, so that it is practical to use rods 86 passing down the length of the core fixture to bear against the electrodes. Even in this arrangement, the provision of a restoring force by springs pulling the electrodes towards their retracted position may be desirable, since that assures an absence of backlash in the drive applied to the electrodes by the cross arms.

It is assumed in FIG. 6 that the electrode can be arranged so that there is room to retract the idle electrodes beyond the clearance position while the working electrodes are advanced and caused to penetrate into the workpiece. In that case, the electrode movements can be controlled by turning the shaft 87, as for example by a mechanical arrangement such as is shown in FIG. 5. On the other hand, it is also possible to provide individually movable cross arms, mounting the cross arms at each end of the fixture that drives one pair of electrodes on the shaft 87 and mounting the other pair on sleeves provided on the shaft 87 at each end of the fixture, in which case two cross arms may be individually driven by separate servos operated in proper sequence where they may be driven by a linkage which disengages from one cross arm before engaging and moving the other.

Figure 7:
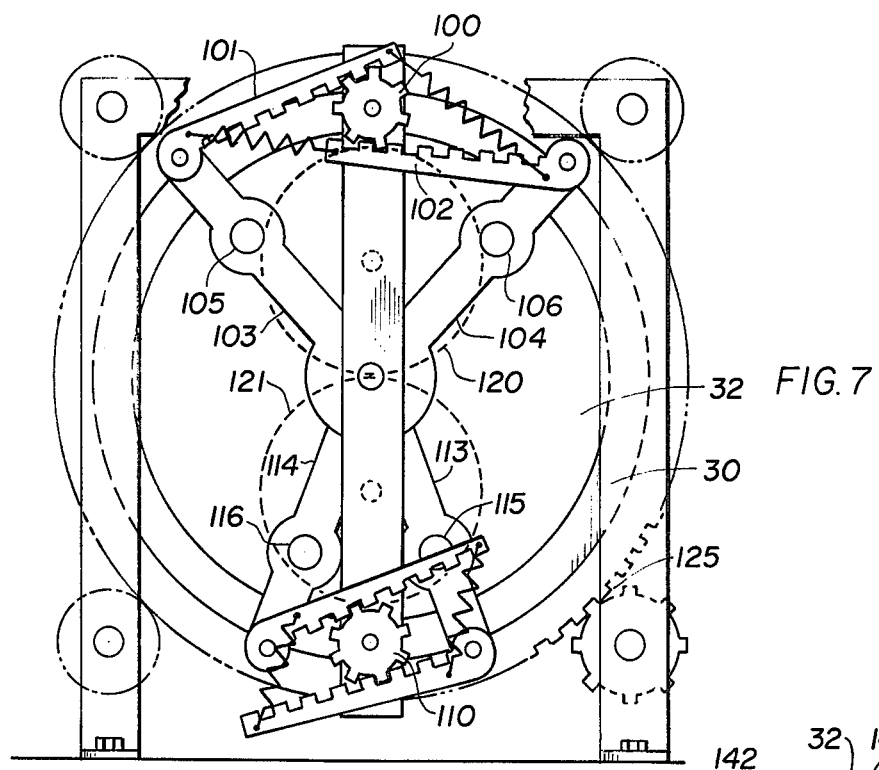
FIG. 7 shows another alternative mechanism for displacing the electrodes in a fixture of the kind shown in FIG. 2.

It may be desired, for reasons of dielectric flushing, always to cut with the downward moving electrode of the pair situated in a particular work cavity. In that case, the electrodes operated simultaneously would not be actuated by a cross arm on the shaft 47, as in FIG. 2, but would be moved in the fashion diagrammatically shown in FIG. 7, in which a pinion 100, acting on the racks 101 and 102, is used to vary the spread of the arms 103 and 104, moving the rods 105 and 106, which pass through the fixture and actuate the electrodes not shown in the drawing. Then, after the work of those two electrodes has been completed, the assembly of the workpiece and core may be rotated together by 180° and the direction of flushing liquid reversed, after which the pinion 110, which will now be at the top of the device, is then similarly driven to spread the arms 113 and 114 to move the rods 115 and 116 for actuation of the other pair of electrodes. The pinions 100 and 110 may be geared together by gears shown in dashed lines 120 and 121 if it should be desired to drive them from the same drive, in which case of course the electrodes not being used would be given an extra retraction movement during the advance of the working electrodes. Means for rotating the position of the workpiece and its contained fixture are symbolically illustrated at 125 by the representation of a pinion and ring gear, and would necessarily involve considerable expense, since it would be necessary to assure firm clamping of the fixture inside the workpiece even though the workpiece is mounted in bearings (not shown) and equipped with a drive symbolized at 125. It is unlikely that the above-mentioned consideration regarding fluid flow would justify an electrode drive arrangement in a fixture according to the present invention which is as complicated and expensive as the kind diagrammed in FIG. 7, but the possibility of so doing is described to illustrate the many ways in which it is possible to practice the method and operate apparatus according to the present invention for cutting undercut channels in hollow bodies by electroerosion.

Figure 8:
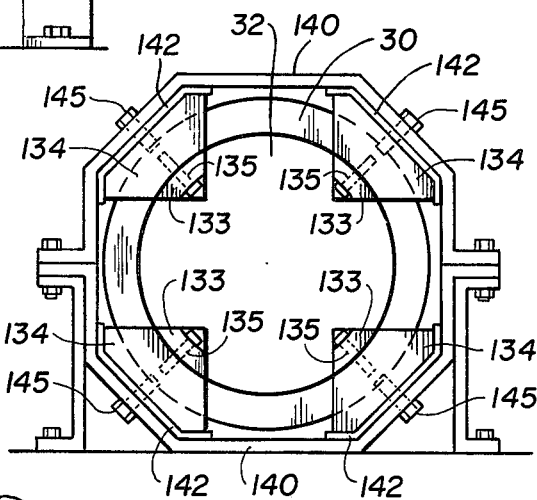
FIG. 8 is a diagrammatic end view of a fixture and workpiece securing arrangement useable in the set-up arrangement of FIG. 4 in connection with a fixture of the kind shown in FIG. 2.

In connection with FIG. 2, it was pointed out that the cavities 33 provided between the core fixture and the workpiece could be used for clamping the fixture to the workpiece. This may be done in various ways, for example by inserting hollow elastic members of conforming shape into these cavities and introducing air or liquid under pressure therein (by means that were not shown in FIG. 3, FIG. 4 or FIG. 5 in order to simplify the illustration). Actually, elastic pressure chambers could be built right into the fixture, cemented in place and provided with valves at one end so that they could easily be inflated and deflated. Alternately, a mechanical clamping arrangement could be provided, as shown in FIG. 8, which would at the same time mount the workpiece, making the clamps 60 and 61 shown in FIG. 4 unnecessary. In FIG. 8, the quadrant shaped rods 133 that pass through the entire length of the cavities 33 are fastened to thick end plates 134, as by screws 135. A metal strap frame 140 of octagonal shape clears the entire assembly at each end and fits against diagonal portions of the plates 134 with interposition of elastic compressible gaskets 142, so that screws 145 can be tightened to pull the rods 133 radially outward to clamp the fixture in the workpiece. The frame 140 can itself be clamped or screwed to the work table 73 by means not shown to mount the workpiece and fixture firmly in the machine.

Figure 9:
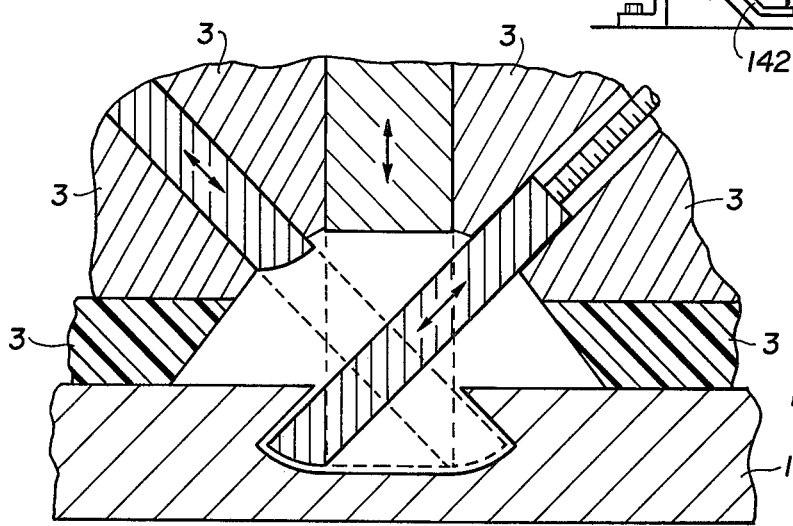
FIG. 9 is a diagrammatic cross-section of a portion of a fixture according to the invention in which three electrodes are displaceable for producing an undercut long channel in a workpiece.

The invention is not limited to cutting undercut channels in a workpiece with the use of only two electrodes per channel, as it may sometimes be useful to use three or more electrodes. FIG. 9 is a diagram similar to FIG. 1 illustrating the use of three electrodes to cut a channel. FIG. 9 also illustrates the use of electrodes having a partly rounded profile to produce a channel with a rounded bottom.

It will accordingly be seen that many variations are possible in the method and apparatus of the invention within the inventive concept. It is also to be understood that features described in connection with one illustrative embodiment or method may find an analogous application in other embodiments or methods according to the invention. Furthermore, if the workpiece is closed at one end, a core fixture can be used with actuating equipment for the electrodes protruding from the workpiece at only one end.

I claim:

1. A method of cutting channels of undercut profile in a workpiece by electroerosion machining, comprising the steps of:
    securing the workpiece to a fixture body equipped with a plurality of electroerosion tool electrodes movably set therein adjacent to a work space between said fixture body and said workpiece;
    advancing a first of said electrodes across said work space and, under control with reference to at least one electroerosion process parameter, obliquely into said workpiece for a predetermined distance to produce a cavity therein;
    retracting said first electrode from said cavity and from enough of said work space to clear a path for a second electrode of said electrodes across said work space, which path intersects the path of advance and retraction of said first electrode;
    advancing said second electrode on said intersecting path across said work space and, under control with reference to at least one electroerosion process parameter, into said workpiece to produce a cavity therein, and
    retracting said second electrode from the cavity produced by it and from enough of said work space to clear the path of advance of said first electrode.

2. A method as defined in claim 1 in which the step of advancing said second electrode is carried out by advancing said second electrode obliquely into said workpiece so as to produce a cavity that enlarges the cavity produced by said first electrode in such a manner that the enlarged cavity takes the form of a channel in the workpiece that is undercut on both sides thereon.

3. A method as defined in claim 2 which also includes the steps of advancing a third electrode across said work space and, under control with reference to at least one electroerosion process parameter, into said workpiece to produce a cavity connecting with the cavities produced by said first and second electrodes, the advancing of said third electrode being on a path that intersects the paths of said first and second electrodes across said work space and into said workpiece, and then retracting said third electrode from the cavity produced by it and from enough of said work space to clear the respective paths of advance of said first and said second electrodes.

4. A method as defined in claim 1 in which said workpiece is a hollow body, in which the step of securing the workpiece to a fixture body is performed by securing the fixture body within the hollow portion of said hollow body, and in which the steps of advancing said electrodes into said workpiece is carried out so as to produce cavities communicating with the inside of said hollow body.

5. A method as defined in claim 4 in which a plurality of channels of undercut profile are simultaneously cut in said workpiece by electroerosion machining, in which, further, a plurality of electrodes are simultaneously advanced respectively across a plurality of work spaces of said fixture into different portions of said workpiece in every electrode advancing step, the first electrode advancing step being the step of advancing a first electrode of each of a set of electrodes respectively adjacent to each of said work spaces, the second advancing step likewise being the advancing of second electrodes of each of said sets of electrodes, and in which the retracting steps likewise consist of retracting a corresponding plurality of electrodes.

6. A method as defined in claim 5 in which each electrode advancing step and each electrode retracting step is performed by simultaneously moving one electrode of each of two pairs of electrodes.

7. A method as defined in claim 5 in which the step of advancing electrodes is performed by transmitting motion to said electrodes by arms extending substantially radially from end portions of a rotatable shaft centrally located in said fixture, each of said arms being disposed so as to bear against an electrode and thereby cause displacement thereof for at least a part of the range of travel of the arms when said shaft is rotated away from a position in which said arms are so disposed that all of said electrodes are retracted.

8. A method as defined in claim 5 in which the step of retracting electrodes is performed with the aid of elastic restoring force provided by spring means into which mechanical energy is stored during the preceding step of electrode advancing.

9. An electrode fixture for holding and directing the movement of a plurality of tool electrodes for cutting an undercut channel in a workpiece by electroerosion machining, comprising:
    a fixture body arranged for being secured in fixed relation to a workpiece in such a way as to provide a work cavity between said body and said workpiece and equipped with a plurality of guideways for guiding movement of a corresponding plurality of electrodes therein towards and away from said cavity and said workpiece, said guideways being oriented so that the electrode movements guided thereby have paths that intersect with intersections located at least in part in said work cavity;

a plurality of electroerosion electrodes movably mounted respectively in said guideways;

means for sequentially moving said electrodes so that each electrode in turn may be moved in a cycle of advance into electroerosion working position, electroerosive penetration to a predetermined depth in the workpiece and retraction sufficient to clear the intersection of the electrode movement path with the movement path of the other electrodes, and duct means for supplying a liquid to said work cavity so as to cause at least part of said liquid to pass through the gap between an active electrode and said workpiece, and for removing said liquid from said fixture after at least part of said liquid has passed through said gap.

10. An electrode fixture as defined in claim 9 having also means for connecting said electrode moving means with the servo controlled electrode advance drive of an electroerosion machining apparatus and thereby enabling the advance of said electrodes into said workpiece to be controlled with reference to at least one electroerosion process parameter.

11. An electrode fixture as defined in claim 9 in which two guideways are provided adjacent to each work cavity provided by said fixture body, each of said guideways being such that the respective electrodes in them are movable so as to penetrate obliquely into said workpiece.

12. An electrode fixture as defined in claim 9 in which three of said guideways are adjacent to each work cavity of said fixture body and three electrodes respectively movable in said three guideways are movable one by one across said work cavity into said workpiece.

13. An electrode fixture as defined in claim 9 in which said workpiece is a hollow body and said fixture body is arranged for being secured inside the hollow portion of said body in such a way as to provide a plurality of work cavities adjacent to each of which a plurality of said guideways and electrodes are provided.

14. An electrode fixture as defined in claim 13 in which a rotatable shaft is provided through the center of said fixture body and equipped with means for transmitting rotary motion of said shaft to produce linear motion of an electrode of each work cavity group.

15. An electrode fixture as defined in claim 9 in which said workpiece is at least in part tubular, in which said fixture body is arranged to be secured inside said tubular workpiece so as to provide a plurality of work cavities, having their respective longest dimensions oriented parallel to the axis of the tubular portion of said workpiece, between said fixture body and said workpiece, in which a pair of said guideways and a pair of said electrodes are adjacent to each of said work cavities, and in which said electrodes are arranged to be advanced in sets one set at a time in a movement that advances simultaneously and across said work cavities, one electrode of the set being advanced.

16. An electrode fixture as defined in claim 15 in which said fixture body is constituted so as to provide two work cavities facing diammetrically opposite portions of the interior of the tubular portion of said workpiece.

17. An electrode fixture as defined in claim 15 in which said fixture body is provided with a centrally located rotatable shaft for transmitting motion from a drive external to said electrode fixture to said electrode, said shaft being equipped at each end thereof with arms arranged so as to propel a corresponding end of an electrode to be advanced in its guideways.

18. An electrode fixture as defined in claim 15 in which said fixture body is provided with a centrally located rotatable shaft for transmission of motion to said electrodes from a motion source external to said electrode fixture, said shaft being equipped at at least one axial end of said fixture with arms of a configuration suitable for electrode actuation in response to rotation of said shaft away from a position in which said arms are so disposed that all of said electrodes are retracted.

19. An electrode fixture as defined in claim 15 in which spring return means are provided for exerting a force on said electrodes when they are out of their retracted position tending to restore them to their respective retracted position.

20. An electrode fixture as defined in claim 19 in which each set of simultaneously advanced electrodes is arranged to be propelled towards the workpiece by a common member affixed to a rotatable shaft centrally located in said fixture body and extending radially in different directions from said shaft for the respective electrodes simultaneously driven, and in which said common member is arranged for similarly propelling another set of simultaneously operable electrodes when the first-mentioned simultaneously operable electrodes are in their retracted position.

21. An electrode fixture as defined in claim 9 in which said fixture body, in addition to being arranged for being secured in fixed relation to the workpiece, includes means for securing said workpiece in fixed relation to an electroerosion apparatus.

* * * * *